(12) United States Patent
Jezequel et al.

(10) Patent No.: US 9,772,218 B2
(45) Date of Patent: *Sep. 26, 2017

(54) WEIGHING DEVICE

(71) Applicant: Molins PLC, Buckinghamshire (GB)

(72) Inventors: Alex Jezequel, Buckinghamshire (GB); Andrew Stevenson, Buckinghamshire (GB)

(73) Assignee: MOLINS PLC, Milton Keynes (GB)

( * ) Notice: Subject to any disclaimer, the term of this patent is extended or adjusted under 35 U.S.C. 154(b) by 90 days.

This patent is subject to a terminal disclaimer.

(21) Appl. No.: 14/731,030

(22) Filed: Jun. 4, 2015

(65) Prior Publication Data

US 2015/0268088 A1    Sep. 24, 2015

Related U.S. Application Data

(63) Continuation of application No. PCT/GB2013/053064, filed on Nov. 20, 2013.

(30) Foreign Application Priority Data

Dec. 5, 2012 (GB) .................................. 1221921.8

(51) Int. Cl.
*G01G 21/22* (2006.01)
*B65B 1/46* (2006.01)
*G01G 17/04* (2006.01)

(52) U.S. Cl.
CPC ............... *G01G 21/22* (2013.01); *B65B 1/46* (2013.01); *G01G 17/04* (2013.01)

(58) Field of Classification Search
None
See application file for complete search history.

(56) References Cited

U.S. PATENT DOCUMENTS

| | | | |
|---|---|---|---|
| 3,549,773 A | 12/1970 | Scheidig et al. | |
| 3,808,772 A * | 5/1974 | Turtschan | B29C 51/20 425/387.1 |
| 5,187,921 A * | 2/1993 | Wilson | B26D 1/245 141/1 |

(Continued)

FOREIGN PATENT DOCUMENTS

| | | |
|---|---|---|
| EP | 1014053 | 6/2000 |
| EP | 1449767 | 8/2004 |

(Continued)

*Primary Examiner* — Paul West
*Assistant Examiner* — Mark A Shabman
(74) *Attorney, Agent, or Firm* — Jeffrey D. Myers; Peacock Myers, P.C.

(57) ABSTRACT

A weighing device is disclosed including a motor that can be used to rotate a drive head. The drive head supports a cylindrical spindle having a plurality of holes or recesses. The spindle is configured so that it can be easily removed from the rotatable drive head and placed on a load sensor that can be used for weighing the device. In use a blister strip (not shown) can be loaded onto the spindle. An evacuation unit is provided with a pair of cutting blades. The load sensor can determine a first measurement of weight when the blisters are full of powder and a second measurement of weight after the evacuation unit has been used to evacuate receptacles supported on the spindle.

20 Claims, 5 Drawing Sheets

(56) References Cited

U.S. PATENT DOCUMENTS

| | | | | |
|---|---|---|---|---|
| 5,796,051 | A | * | 8/1998 | Chiari .................. G01G 15/001 |
| | | | | 177/119 |
| 6,770,823 | B2 | * | 8/2004 | Buckner, III ............. B65B 1/46 |
| | | | | 141/83 |
| 2002/0134591 | A1 | | 9/2002 | Fermier et al. |
| 2004/0055792 | A1 | * | 3/2004 | Reiser .................... G01G 21/22 |
| | | | | 177/210 R |
| 2007/0062164 | A1 | * | 3/2007 | Gamberini ........... B65G 47/525 |
| | | | | 53/502 |
| 2008/0219803 | A1 | * | 9/2008 | Runft .................... G01G 17/00 |
| | | | | 414/21 |
| 2014/0326519 | A1 | * | 11/2014 | Moulder ................ G01G 15/00 |
| | | | | 177/145 |

FOREIGN PATENT DOCUMENTS

| | | |
|---|---|---|
| GB | 2269354 | 2/1994 |
| WO | 2008139295 | 11/2008 |
| WO | 2013083970 | 6/2013 |

* cited by examiner

WEIGHING DEVICE

CROSS-REFERENCE TO RELATED APPLICATIONS

This application is a continuation application of Patent Cooperation Treaty Application No. PCT/GB2013/053064, entitled "Weighing Device", to Molins PLC, filed on Nov. 20, 2013, which claims priority to Great Britain Patent Application Serial No. 1221921.8 filed Dec. 5, 2012, and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention relates to a weighing device, and specifically a weighing device that can be used to measure the weight of powder in blister packs.

Description of Related Art

Pharmaceutical powder products are often provided in blister packs, formed of a moulded plastic strip and covered with a foil or paper capping material. These blister packs are typically filled in a production line and a powder dispensing head is configured to provide a particular dose of powder into an individual blister or receptacle. The blisters or receptacles are then covered with the capping material.

It is of fundamental importance that the dispensing head provides a precise dose of powder to each receptacle. Any error in the dose could contravene regulatory requirements and/or put a patient's health in jeopardy.

In-line techniques for measuring the weight of powder in blister packs typically involve measuring the weight of blister packs during the manufacturing process, and then subtracting the assumed weight of the packaging material. In these techniques a load measuring device is typically provided to measure the weight of blister packs as they are translated horizontally in a manufacturing assembly. A problem with many in-line techniques is that the accuracy of weight measurements is reduced when the measurements are performed at speed. In addition, any errors in the assumed weight of packaging will have an adverse effect on the accuracy of any conclusions for the weight of powder.

Off-line techniques for measuring the weight of powder in blister packs typically involve an analysis at the end of a manufacturing run. Typically an individual blister strip is selected and weighed, and the results for this blister strip are assumed to be indicative of all blister strips produced in the manufacturing run. An example off-line measurement technique is described in EP 1449767. In this document a technique is described whereby a powder filled blister is punched from a blister strip without breaking the blister. The punched blister is then weighed, and the weight of the powder is determined by subtracting the assumed weight of the packaging material. It would be desirable to have an off-line technique that can measure the weight of powder in blisters that cannot be easily separated from a strip using a punching process. Another limitation of the technique described in EP 1449767 is that there may be inaccuracies in the assumed weight of packaging in a punched blister and there may be inconsistencies in the weight of packaging included each time a blister is punched from a strip.

BRIEF SUMMARY OF THE INVENTION

An object of the present invention is to provide an apparatus for weighing powder in receptacles such as blister strips that overcomes some of the problems outlined above.

According to an aspect of the invention there is provided a weighing device comprising: a rotatable drive head; a spindle that can be mounted on the rotatable drive head, wherein the spindle is configured to support a plurality of receptacles filled with powder, and wherein the spindle can also be dismounted from the rotatable drive head; a load measuring device capable of measuring the combined weight of the spindle and any supported receptacles; and an evacuation unit configured to evacuate receptacles that are supported on the spindle.

In this way receptacles such as blister packs can be fitted to the spindle. The evacuation means can remove powder from the receptacles, and the load measuring device can determine a weight for the spindle and the receptacles both before and after the powder is removed. In this way the load measuring device can determine the weight of powder in each individual receptacle. This can be useful for determining powder doses in receptacles for a particular batch of filled receptacles.

The rotatable spindle can be removed or dismounted from the rotatable drive head so that receptacles can be loaded. This can facilitate easy loading and unloading of receptacles such as blister strips. In one arrangement the blister strips can be wound onto the spindle so that individual blisters are received in corresponding recesses on the spindle. The recesses may be arranged in a helical pattern to facilitate easy loading.

Preferably the spindle can be dismounted from the rotatable drive head so that the load measuring device can weigh the spindle and the plurality of receptacles. This can ensure accurate results so that only the weight of the spindle and the receptacles bears on the load measuring device.

In one arrangement the spindle may be lowered onto the load measuring device by a device such as a pneumatic cylinder. Preferably the spindle is disengaged or dismounted from the rotatable drive head when the spindle bears on a surface of the load measuring device. This may be achieved in one arrangement if the spindle hangs from the rotatable drive head under gravity and the rotatable drive head is lowered beyond the point that is required to bring the spindle into contact with the load measuring device.

Preferably the spindle has a locating feature that engages with a corresponding feature on the rotatable drive head. In this way the spindle can re-engage with the drive head in the correct orientation after it has been dismounted. In one embodiment a v-shaped groove is provided in the spindle that can engage with a v-shaped protrusion on the rotatable drive head.

The spindle is preferably tubular in shape and it may have a circular cross-section. A cut-out is preferably provided at one end to allow the spindle to be mounted easily on the rotatable drive head. The cut-out may be provided so that there is a gap in the cross-sectional profile of the spindle at one end.

The spindle is preferably made of a low-mass material. By selecting a low-mass material the ratio of powder to spindle mass is improved. This can provide more accurate measurements of powder mass, after the mass of the spindle has been subtracted. The material of the spindle is preferably conductive in order to prevent the build up of static charge. This is desirable so that electrical forces between the spindle and other components do not affect measurement accuracy. The material of the spindle is preferably non-magnetic in order to ensure that magnetic forces between the spindle and other components do not affect measurement accuracy. It has been found that titanium is a preferred material for the spindle based on the foregoing considerations.

The evacuation unit preferably includes a piercing member that is arranged to cut through the receptacles and liberate the powder within. In blister packs the surface that is pierced is generally made of aluminium foil or paper. The piercing member is preferably moveable relative to the receptacle in a reciprocating manner in order to create a passage for powder to exit the receptacles. The reciprocating motion may also be useful in agitating and freeing powder that may have become caked. The piercing member is preferably arranged to reciprocate in a direction that is tangential to the direction in which the piercing member is introduced to the receptacle. Most preferably, the piercing member can reciprocate in order to expand an opening that it creates in the receptacle.

More than one cutting surface may be provided in the piercing member. In one arrangement two cutting surfaces are provided side by side. The creation of two slits in the receptacle has been found to be advantageous in liberating the powder. It is preferred that the piercing member creates a slit, rather than a flap in the receptacle to minimise the risk that a portion of the receptacle is removed during the piercing process. The skilled person will appreciate that the removal of a portion of the receptacle would be disadvantageous as it would create inaccurate measurement results.

The evacuation unit preferably comprises at least one air port for providing a positive or negative airflow to the receptacle. Preferably at least a negative airflow is provided by a vacuum generator. Additionally a positive airflow may also be provided to agitate the powder in the receptacle and to ensure that all of the powder is removed. The positive airflow may help to stimulate turbulence in the receptacle and to free any powder that may have become adhered to receptacle surfaces.

The evacuation unit may comprise a first port for providing a positive airflow and a second port for providing a negative airflow. In this way the positive and negative airflow can be provided simultaneously. A narrow jet of air can therefore be blown into the receptacle to remove powder and the negative airflow can remove powder for disposal or subsequent analysis. Control electronics may be provided so that the first and second ports are controlled independently. In this way the timing of the positive and negative airflows may be controlled to provide maximum powder extraction.

Preferably a sealing element is provided around the receptacle when the powder is removed by the evacuation unit. This may prevent any spillage of powder on the load measuring device which would otherwise interfere with the precise weight measurements. A circumferential sealing skirt, preferably made of an elastomeric material such as rubber, may be provided around the receptacle. The sealing element may also prevent any of the airflows from the first and/or second ports from escaping the vicinity of the receptacle and interfering with the precise weighing measurements.

The load measuring device is preferably provided in a chamber that is generally closed. The chamber does not need to be sealed in an airtight fashion, but by closing the chamber it is possible to shield the load measuring device from any turbulent air that could otherwise affect measurements adversely. A door may be provided for accessing the measurement chamber.

The spindle preferably includes a marker feature that can be detected to determine its orientation. The marker feature may be a printed mark on the surface of the spindle that can be detected by a detector such as a camera. Alternatively the marker feature may be a hole that is drilled through a surface of the spindle.

According to another aspect of the invention there is provided a method of measuring the weight of powder in a receptacle, the method comprising the steps of: mounting a plurality of receptacles filled with powder on a spindle; mounting the spindle on a rotatable drive head; weighing the spindle and the plurality of receptacles using the load measuring device to determine a first weight; evacuating at least one receptacle; weighing the spindle and the plurality of receptacles again using the load measuring device to determine a second weight; determining the weight of powder in the at least one evacuated receptacle by subtracting the second weight from the first weight.

Apparatus features may be provided as method steps and vice-versa.

BRIEF DESCRIPTION OF THE SEVERAL VIEWS OF THE DRAWINGS

Embodiments of the present invention will now be described, by way of example only, with reference to the accompanying drawings in which.

DETAILED DESCRIPTION OF THE INVENTION

Figure 1:
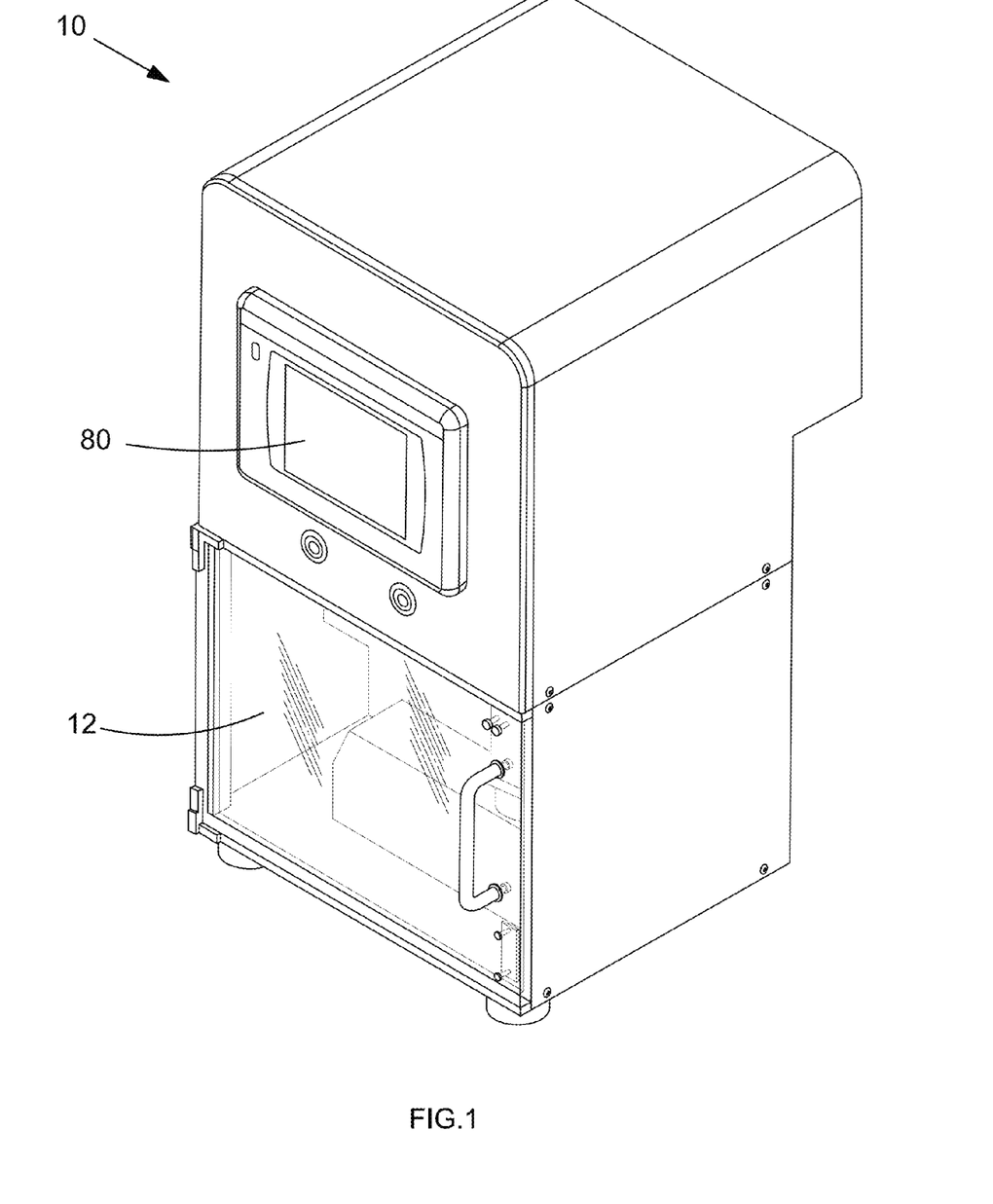
FIG. 1 is a perspective view of a weighing device in an embodiment of the present invention.

FIG. 1 is a perspective view of a weighing device 10. The weighing device 10 includes a display screen 80 and control electronics (not shown). A transparent door 12 is provided at the lower end of the device. The door 12 can be closed to create a chamber in which sensitive weighing measurements can be performed without being adversely affected by environmental factors such as turbulent air effects.

Figure 2:
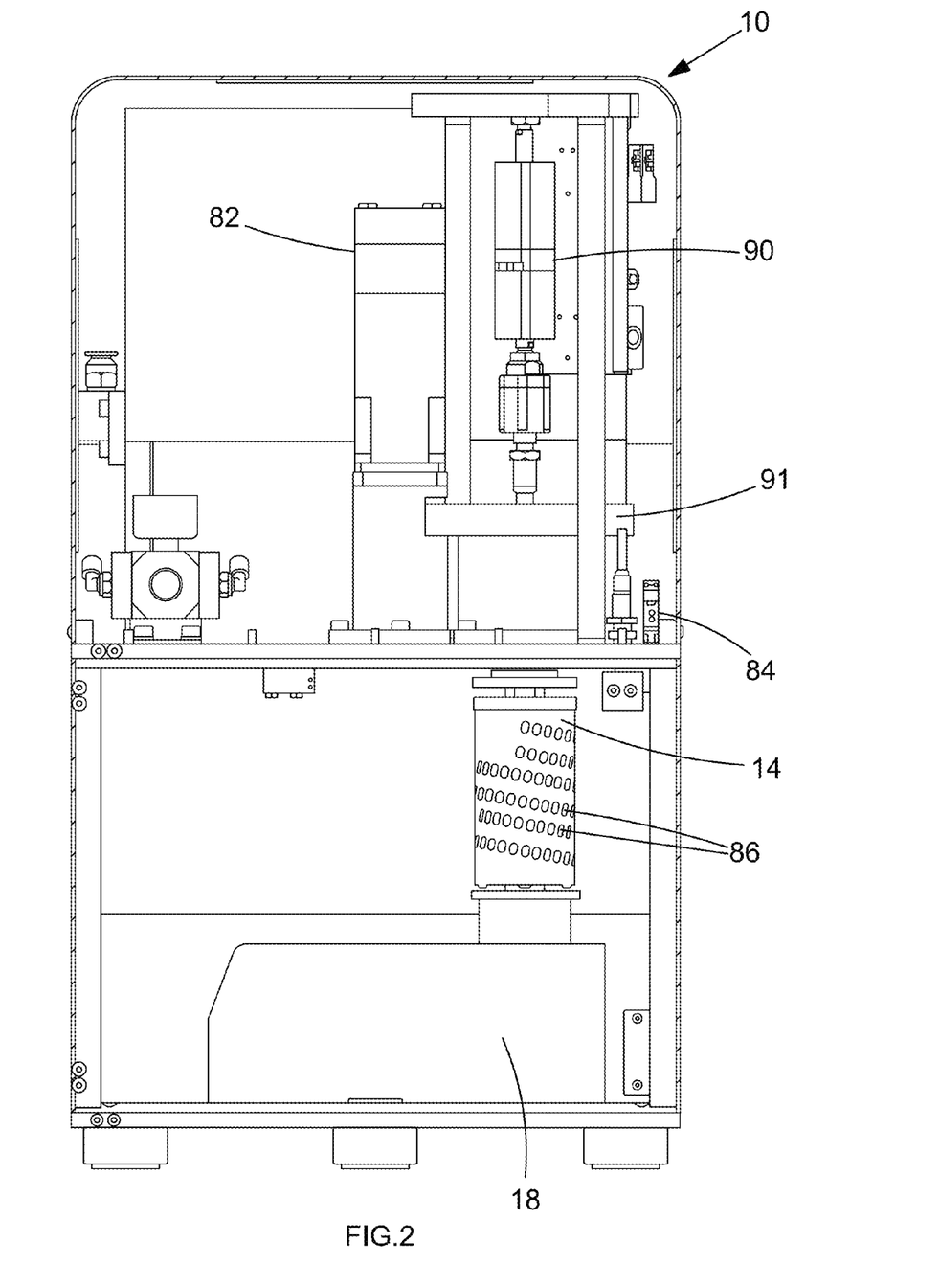
FIG. 2 is a cross-sectional front view of the apparatus shown in FIG. 1.
Figure 3:
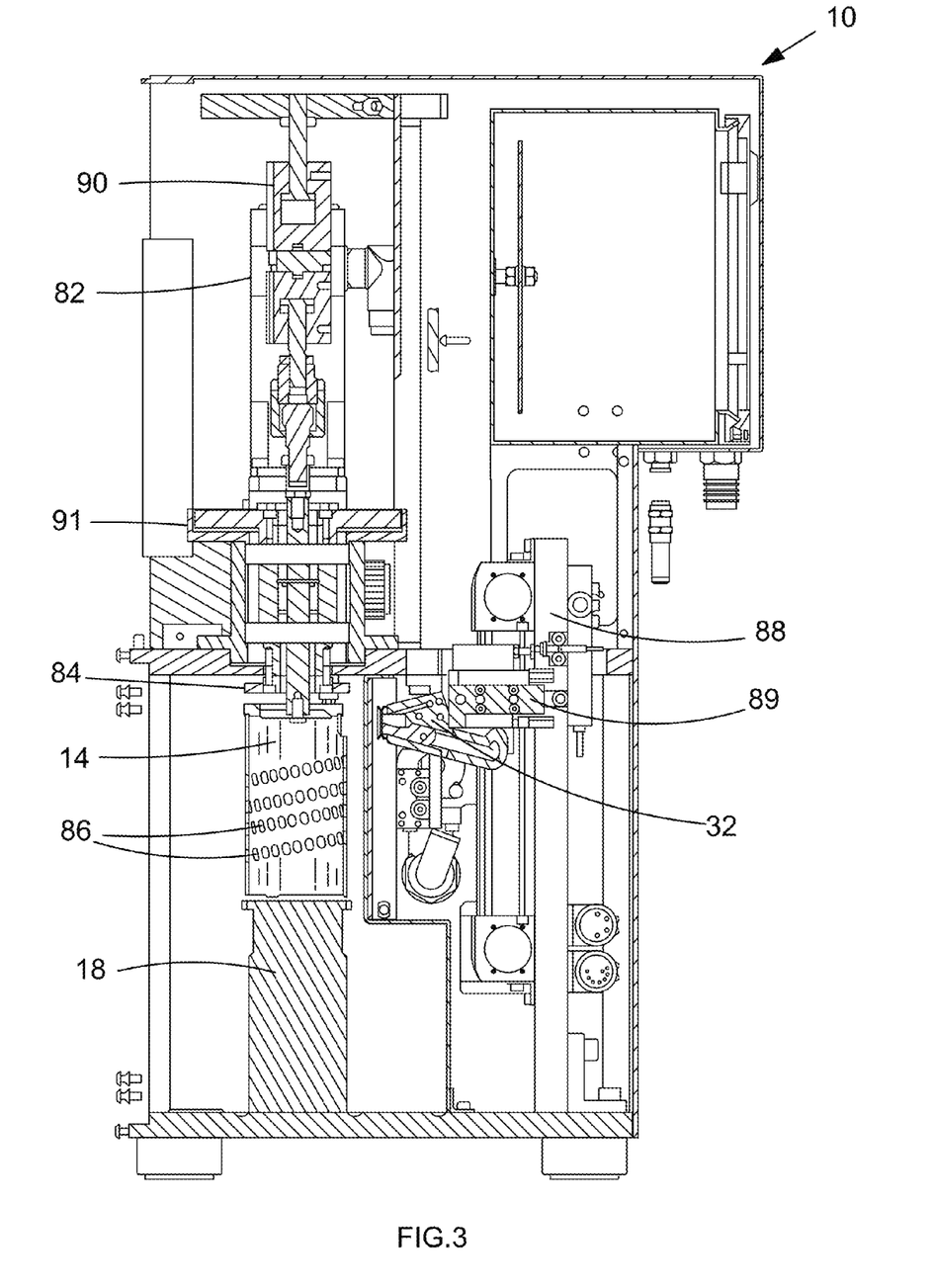
FIG. 3 is a cross-sectional side view of the apparatus shown in FIG. 1.

Further detail of the weighing device 10 can be seen with reference to FIGS. 2 and 3. The weighing device includes a motor 82 that can be used to rotate a drive head 84. A gear 91 to the motor 82 is also provided. The drive head 84 supports a cylindrical spindle 14 having a plurality of holes or recesses 86. The spindle 14 is clamped to the drive head 84 when it is being rotated. Otherwise the spindle 14 is arranged to hang from the drive head 84 under gravity. The recesses 86 are provided in a helical pattern around an outer surface of the spindle 14.

The spindle 14 is configured so that it can be easily removed from the rotatable drive head 84. In use, a blister strip can be loaded onto the spindle 14. The moulded plastic component of each blister in the strip fits snugly in each recess 86, and the recesses are separated by a distance that is equal to the separation of blisters on the strip. The foil or paper cover of the blisters is directed radially outwardly with respect to the cylindrical spindle 14 when the blisters are loaded.

The weighing device 10 also includes a load sensor 18 that can be used for weighing the spindle and the loaded blister strip. An evacuation unit 32 is provided to one side of the spindle 14 and a motor 88 is provided to adjust the position of the evacuation unit 32. The motor 88 can be used to drive the evacuation unit 32 towards the spindle 14, and to adjust its vertical height.

A pneumatic cylinder 90 is provided for adjusting the vertical height of the drive head 84. Specifically, the pneumatic cylinder 90 can lower the drive head 84 and the spindle 14 (when mounted) so that the spindle 14 bears on a surface of the load measuring device 18. The pneumatic cylinder 90 can also lift the spindle 14 away from the load measuring device 18.

Figure 7:
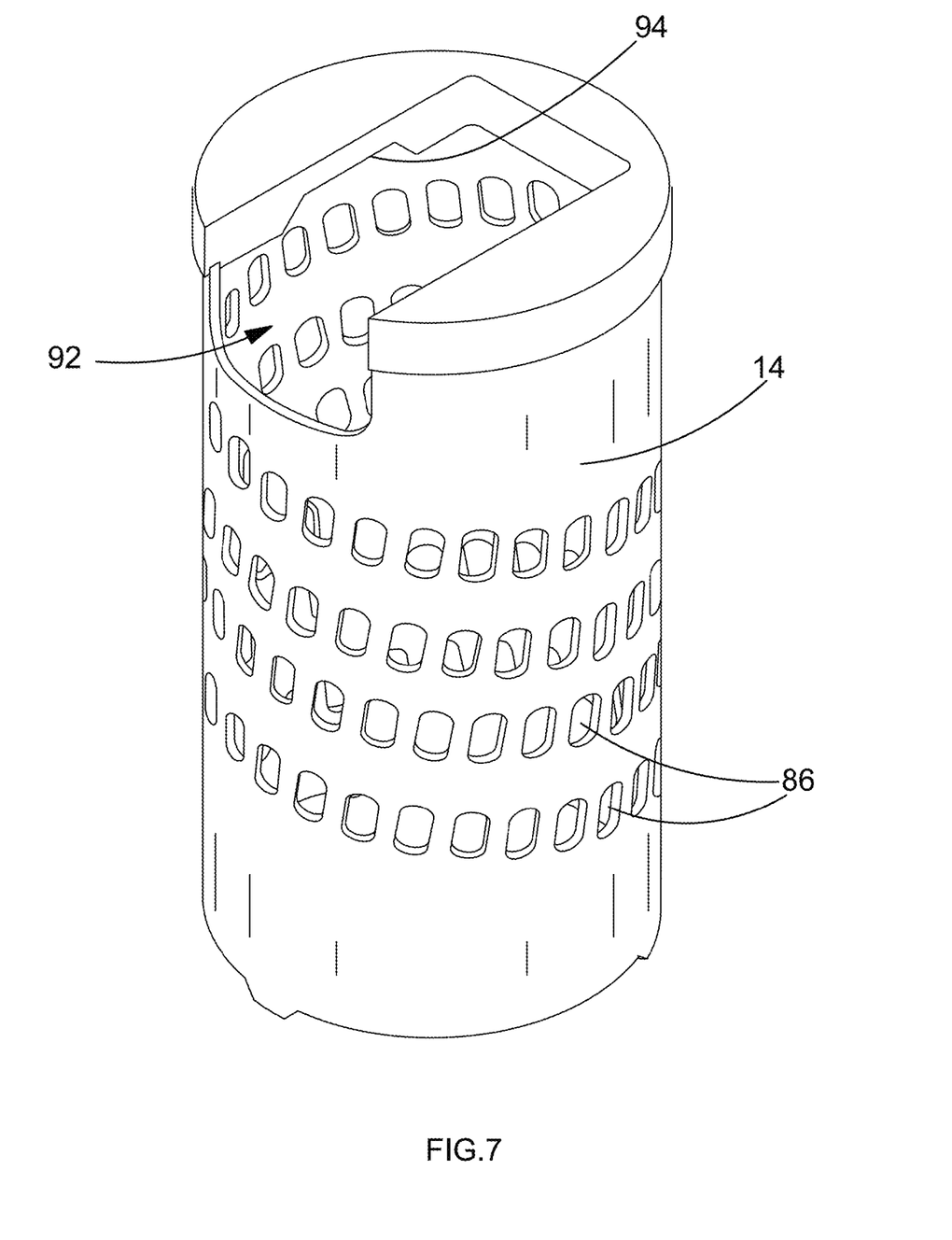
FIG. 7 is a view of a perspective view of a spindle on which receptacles may be mounted in an embodiment of the invention.

Further detail of the spindle 14 can be appreciated from the perspective view in FIG. 7. The spindle 14 includes a cut-out 92 at its upper end to facilitate easy mounting on the drive head 84. The spindle 14 also includes a v-shaped groove 94 on the underside of its upper surface, and the v-shaped groove is shaped to that it can engage with a corresponding v-shaped protrusion on an upper surface of the drive head 84. The spindle 14 is mounted by passing the drive head 84 through the cut-out 92 and then adjusting the orientation of the spindle 14 until the v-shaped grove 94 locks on the v-shaped protrusion.

The spindle 14 is made of titanium. This material is selected because it is of low mass. Titanium is also electrically conductive which is useful as it can prevent the build up of any static charges which could otherwise interfere with the measurements of the load measuring device 18. Titanium is also non-magnetic which can ensure an absence of magnetic forces between the spindle 14 and other components when the spindle 14 rests on the load measuring device 18.

Figure 4:
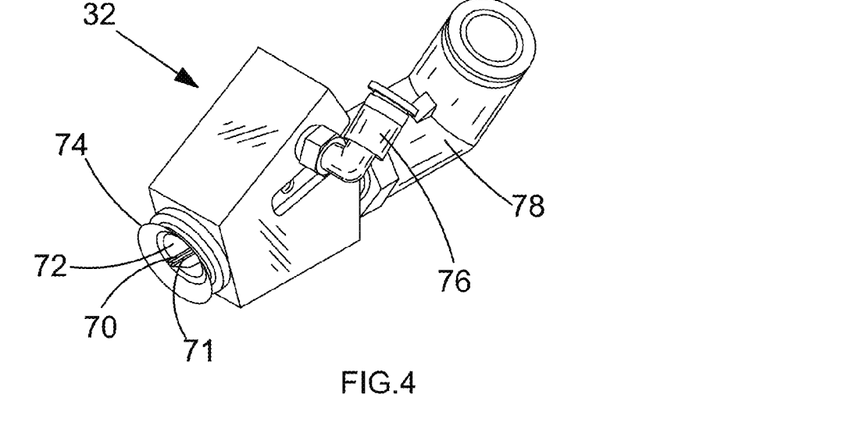
FIG. 4 is a perspective view of an evacuation unit that can be used in an embodiment of the present invention.
Figure 5:
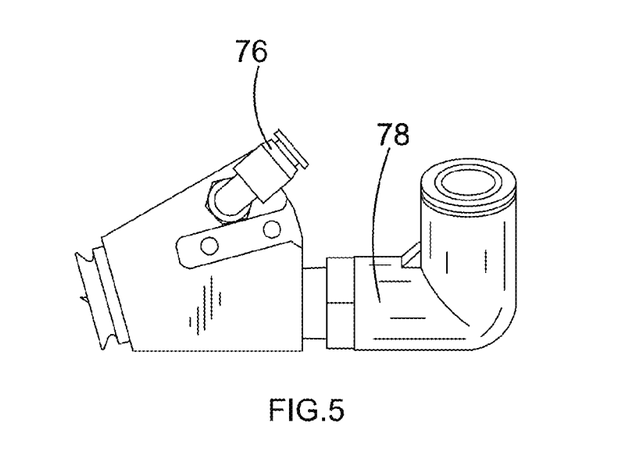
FIG. 5 is a front view of the evacuation unit shown in FIG. 4.

FIGS. 4 and 5 are perspective and side views of the evacuation unit 32. The evacuation unit 32 comprises a pair of cutting blades 70, 71 that are positioned centrally within a main bore 72. The evacuation unit 32 comprises a rubber sealing ring 74 circumferentially around the opening of the main bore 72. Further detail of the cutting blades 70, 71 is provided in FIG. 6.

The evacuation unit 32 comprises first and second pneumatic channels 76, 78. The first and second channels 76, 78 represent alternative forks for air in the main bore 72. The second pneumatic channel 78 is configured to be connected to a vacuum source so that it draws air away from any punctured blisters. Thus, powder can be drawn into the main bore and exhausted in the second pneumatic channel 78. The first pneumatic channel 76 is arranged to provide a positive airflow towards punctured blisters. In this way a narrow jet of air can penetrate the exhaust stream in order to provide a turbulent airflow and dislodge any caked powder.

Control electronics (not shown) are provided to control airflows through the first and second pneumatic channels 76, 78. The timing of the airflows can be controlled in order to provide maximum extraction of powder.

In use, a blister strip is fitted to the spindle 14, and the spindle is mounted on the drive head 84 by hand. The door 12 is then closed and the spindle 14 is clamped to the drive head 84 and rotated until an individual blister is positioned opposite the evacuation unit 32. At this point the pneumatic cylinder 90 lowers the spindle 14 together with the blister strip onto the load sensor 18. The cylinder 90 continues to lower the drive head 84 even after the spindle 14 comes into contact with the load sensor 18 so that the spindle 14 is disengaged or dismounted from the drive head 84. In this way the drive head 84 does not bear any of the weight of the spindle 14, and the load sensor 18 can determine and store a first measurement of weight. Under the command of control electronics, the pneumatic cylinder 90 then lifts the drive head 84 until its v-shaped protrusion re-engages with the v-shaped groove 94 in the spindle 14. The spindle 14 is then lifted so that it is returned to its position adjacent the evacuation unit 32.

Figure 6:
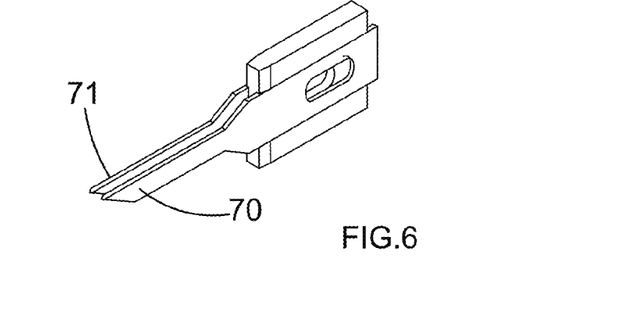
FIG. 6 is a perspective view of cutting blades that may be included in an evacuation unit in an embodiment of the present invention.

The evacuation unit 32 is initially positioned to one side of the spindle 14. When it is desired to puncture a blister an air cylinder 89 moves the evacuation unit 32 into registration with the blister packs so that the cutting blades 70, 71 pierce the outward-facing foil or paper cover. A motor 88 is then arranged to reciprocate the evacuation unit 32 in a vertical direction so that the blades 70, 71 move across the end face of the blister packs. The reciprocal movement of the blades 70, 71 increases the size of the holes in the blister packs to create two parallel slits. The reciprocal movement of the blades 70, 71 may also help to dislodge caked powder.

Once a blister has been pierced the control electronics are configured to activate airflows in the first and second pneumatic channels 76, 78 so that powder is dislodged and exhausted for disposal or analysis. The rubber seal 74 is compressed against the blister strip during this process so that powder cannot escape and drop onto the load sensor 18. The rubber seal 74 can also limit air turbulence created by the first and second pneumatic channels 76, 78 to the immediate vicinity of the pierced blister.

Once the powder has been fully exhausted from a pierced blister the air cylinder 89 and the motor 88 move the evacuation unit 32 away to its original position. The pneumatic cylinder 90 then lowers the spindle 14 back onto the load sensor 18 to determine and store a second measurement of weight. The control electronics are configured to subtract the second measurement of weight from the first measurement of weight in order to determine the weight of powder in the relevant blister.

The motor 82 can be used to index the spindle 14 so that a new blister is adjacent the evacuation unit 32. The evacuation process may then be repeated so that the weight of powder can be determined for the new blister, and for every other blister loaded on the spindle 14. The control electronics are configured to output the determined weight of powder to the screen 80. The weight may be output in any convenient format; for example, the weight of individual blisters or an average may be displayed.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A weighing device comprising:
   a rotatable drive head;
   a spindle that can be mounted on the rotatable drive head, wherein the spindle is configured to support a plurality of receptacles filled with powder, and wherein the spindle can also be dismounted from the rotatable drive head;
   a load measuring device capable of measuring the combined weight of the spindle and any supported receptacles; and
   an evacuation unit configured to evacuate receptacles supported on the spindle.

2. The weighing device of claim 1 wherein the spindle is dismounted from the rotatable drive head when the spindle bears on a surface of the load measuring device.

3. The weighing device of claim 1 wherein a cut-out is provided at one end of the spindle to facilitate mounting on the rotatable drive head.

4. The weighing device of claim 1 wherein the spindle has a locating feature that engages with a corresponding feature on the rotatable drive head.

5. The weighing device of claim 1 wherein the spindle is made of a material that is conductive and/or non-magnetic.

6. The weighing device of claim 1 wherein the spindle is made of titanium.

7. The weighing device of claim 1 wherein the evacuation unit includes a piercing member configured to pierce any receptacles supported on the spindle.

8. The weighing device of claim 7 wherein the piercing member is moveable relative to the receptacle in a reciprocating manner.

9. The weighing device of claim 8 wherein the piercing member can reciprocate in order to expand an opening in the receptacle.

10. The weighing device of claim 7 wherein the piercing member comprises a plurality of cutting surfaces.

11. The weighing device of claim 1 wherein the evacuation unit comprises at least one air port for providing a positive and/or negative airflow to the receptacle.

12. The weighing device of claim 11 wherein the evacuation unit comprises a first port for providing a positive airflow and a second port for providing a negative airflow.

13. The weighing device of claim 12 wherein control electronics is provided so that the first and second ports can be controlled independently.

14. The weighing device of claim 1 wherein a sealing element is provided around the receptacle when the powder is removed by the evacuation unit.

15. The weighing device of claim 1 wherein the spindle includes a marker feature that can be detected to determine the orientation of the spindle.

16. The weighing device of claim 1 wherein the spindle comprises a plurality of recesses arranged to receive the plurality of receptacles.

17. The weighing device of claim 16 wherein the recesses are arranged in a helical pattern around an outer surface of the spindle.

18. A method of measuring the weight of powder in a receptacle, the method comprising the steps of:
   mounting a plurality of receptacles filled with powder on a spindle;
   mounting the spindle on a rotatable drive head;
   weighing the spindle and the plurality of receptacles using the load measuring device to determine a first weight;
   evacuating at least one receptacle;
   weighing the spindle and the plurality of receptacles again using the load measuring device to determine a second weight;
   determining the weight of powder in the at least one evacuated receptacle by subtracting the second weight from the first weight.

19. The method of claim 18 comprising the further step of dismounting the spindle from the rotatable drive head before the weighing step so that only the spindle and the plurality of receptacles bear on the load measuring device.

20. The method of claim 18 comprising the further step of closing a draft shield door before the weighing step is undertaken.

* * * * *